(12) United States Patent
Ye et al.

(10) Patent No.: US 12,235,753 B2
(45) Date of Patent: Feb. 25, 2025

(54) DYNAMIC TUNING OF GARBAGE THRESHOLD TO REDUCE UNRECLAIMABLE GARBAGE OVERHEAD

(71) Applicant: Dell Products L.P., Round Rock, TX (US)

(72) Inventors: Yi Ye, Shanghai (CN); Kalyan C. Gunda, Bangalore (IN); Ao Sun, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 246 days.

(21) Appl. No.: 18/046,304

(22) Filed: Oct. 13, 2022

(65) Prior Publication Data

US 2024/0126689 A1 Apr. 18, 2024

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/064* (2013.01); *G06F 3/0673* (2013.01)

(58) Field of Classification Search
CPC ............. G06F 12/0253; G06F 12/0246; G06F 3/0608; G06F 3/064; G06F 3/0673; G06F 2212/7205
See application file for complete search history.

(56) References Cited

U.S. PATENT DOCUMENTS

| | | | |
|---|---|---|---|
| 2020/0210330 A1* | 7/2020 | Muchherla | G06F 12/0238 |
| 2021/0278990 A1* | 9/2021 | Choi | G06F 3/0652 |
| 2023/0017946 A1* | 1/2023 | Wei | G06F 12/0246 |
| 2023/0325081 A1* | 10/2023 | Patel | G06F 3/0652 |
| | | | 711/166 |
| 2023/0350610 A1* | 11/2023 | Thoppil | G06F 3/067 |

* cited by examiner

*Primary Examiner* — Khoa D Doan
*Assistant Examiner* — Tong B. Vo
(74) *Attorney, Agent, or Firm* — Amin, Turocy & Watson, LLP

(57) ABSTRACT

A system can determine a first correlation between respective percentages of stored garbage and respective amounts of garbage of a block storage system based on determining the respective amounts of garbage among first blocks of the respective blocks that satisfy respective criterions of the respective percentages of stored garbage. The system can, based on the first correlation, determine a second correlation between an estimated throughput applicable to reclaiming garbage in the block storage system and the respective amounts of garbage of the block storage system. The system can, based on the first correlation and the second correlation and for a specified target reclamation throughput, determine a corresponding first percentage of stored garbage of the respective percentages of stored garbage. The system can perform copy-forward garbage collection on second blocks of the block storage system that satisfy a criterion defined with respect to the first percentage of stored garbage.

20 Claims, 11 Drawing Sheets

900

(902)

↓

DETERMINING A CORRELATION BETWEEN A GARBAGE SIZE AND A GARBAGE THRESHOLD OF A BLOCK STORAGE SYSTEM 904

↓

DETERMINING AN ESTIMATED THROUGHPUT ASSOCIATED WITH RECLAIMING DATA IN THE BLOCK STORAGE SYSTEM BASED ON THE CORRELATION BETWEEN THE GARBAGE SIZE AND THE GARBAGE THRESHOLD, WHEREIN THE ESTIMATED THROUGHPUT HAS BEEN DETERMINED TO SATISFY A THRESHOLD THROUGHPUT CRITERION 906

↓

PERFORMING GARBAGE COLLECTION ON RESPECTIVE BLOCKS OF THE BLOCK STORAGE SYSTEM THAT HAVE RESPECTIVE GARBAGE THRESHOLDS THAT SATISFY A CRITERION THAT CORRESPONDS TO THE ESTIMATED THROUGHPUT 908

DYNAMIC TUNING OF GARBAGE THRESHOLD TO REDUCE UNRECLAIMABLE GARBAGE OVERHEAD

BACKGROUND

Block storage can be viewed in contrast to file storage, where data objects are logically stored as files, without regard to which physical blocks on a storage drive are used to store that data object. In block storage, a remote storage drive can be presented as a local drive to a user computer, where an operating system of that user computer can specify what data is stored in which blocks of the storage drive.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can store an indication of respective garbage levels of respective blocks of a block storage system, wherein the respective garbage levels indicate respective amounts of data in the respective blocks that are able to be reclaimed. The system can determine a first correlation between respective percentages of stored garbage and respective amounts of garbage of the block storage system based on determining the respective amounts of garbage of the block storage system among first blocks of the respective blocks of the block storage system that satisfy respective criterions of the respective percentages of stored garbage. The system can, based on the first correlation, determine a second correlation between an estimated throughput applicable to reclaiming garbage in the block storage system and the respective amounts of garbage of the block storage system. The system can, based on the first correlation and the second correlation and for a specified target reclamation throughput, determine a corresponding first percentage of stored garbage of the respective percentages of stored garbage. The system can perform copy-forward garbage collection on second blocks of the block storage system that satisfy a criterion defined with respect to the first percentage of stored garbage.

An example method can comprise determining, by a system comprising a processor, a correlation between a garbage size and a garbage threshold of a block storage system. The method can further comprise determining, by the system, an estimated throughput associated with reclaiming data in the block storage system based on the correlation between the garbage size and the garbage threshold, wherein the estimated throughput has been determined to satisfy a threshold throughput criterion. The method can further comprise performing, by the system, garbage collection on respective blocks of the block storage system that have respective garbage thresholds that satisfy a criterion that corresponds to the estimated throughput.

An example non-transitory computer-readable medium can comprise instructions that, in response to execution, cause a system comprising a processor to perform operations. These operations can comprise determining a correlation between respective amounts of garbage data in blocks of a block storage system and respective percentages of garbage data in respective blocks of the block storage system. These operations can further comprise estimating a throughput that is applicable to reclaiming data in the block storage system based on the correlation between the amount of garbage data and the respective percentages of garbage data, resulting in an estimated throughput. These operations can further comprise determining that the estimated throughput satisfies a function of a threshold throughput. These operations can further comprise performing garbage collection on a group of blocks of the block storage system that have percentages of the respective percentages of garbage data that satisfy a criterion that corresponds to the estimated throughput.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates another example process flow that can facilitate dynamic tuning of garbage threshold to reduce unreclaimable garbage overhead, in accordance with an embodiment of this disclosure;

DETAILED DESCRIPTION

Overview

Storage systems can comprise an underlying storage layer where a minimal storage resource allocation or reclamation unit can be a block or chunk that can contain data of multiple objects or files. Such storage systems can be file storage systems, object storage systems, file storage systems, etc.

Storage systems can implement a copy-forward mechanism to resolve fragmentation, and reclaim space. A copy-forward mechanism can involve not copying blocks below a certain, fixed garbage threshold due to resource utilization considerations (e.g., the computing resources involved with copying these blocks can be considered to be too great relative to a resulting benefit of copying the blocks).

It can be that some users want to define the fixed garbage threshold value for their storage usage instead of using a fixed garbage threshold value that is set for all users. However, it can be that it is impractical for users or operation engineers to monitor unreclaimable garbage to determine an optimal (or appropriate) threshold value on their own.

The present techniques can be implemented to determine a dynamic garbage threshold value that can be determined based on various parameters, such as storage space available, ingestion rate, reclamation speed, amount of unreclaimable garbage, etc. A system according to the present techniques can adjust the garbage threshold value dynamically and automatically to meet a user's targets. This can lead to more storage capacity being freed without unintended resource usage from doing so.

Prior approaches that use a fixed garbage threshold can involve engineers monitoring storage overhead and reclamation throughput, lowering a garbage threshold during idle hours, and raising a garbage threshold during peak outs. This approach can require both experience and sophisticated manual intervention. The present techniques can be implemented so that a system can adjust a garbage threshold dynamically and automatically to meet a user's targets. In this manner, more storage capacity can be freed (relative to prior approaches), without bringing unintended resource usage.

With the present techniques, a user can need only care about targets and constraints rather than more specific details; a garbage threshold can be adjusted automatically, rather than through manual intervention; a garbage threshold can be dynamically adjusted after each round of a scan; an adjustment can be performed in a fine-grained manner by a predictive model, other than just several sets of parameters; and the predictive model can be revised online and with historical data, so the present techniques can be applied to different scenarios and deployments.

Example Architectures and Graph

Figure 1:
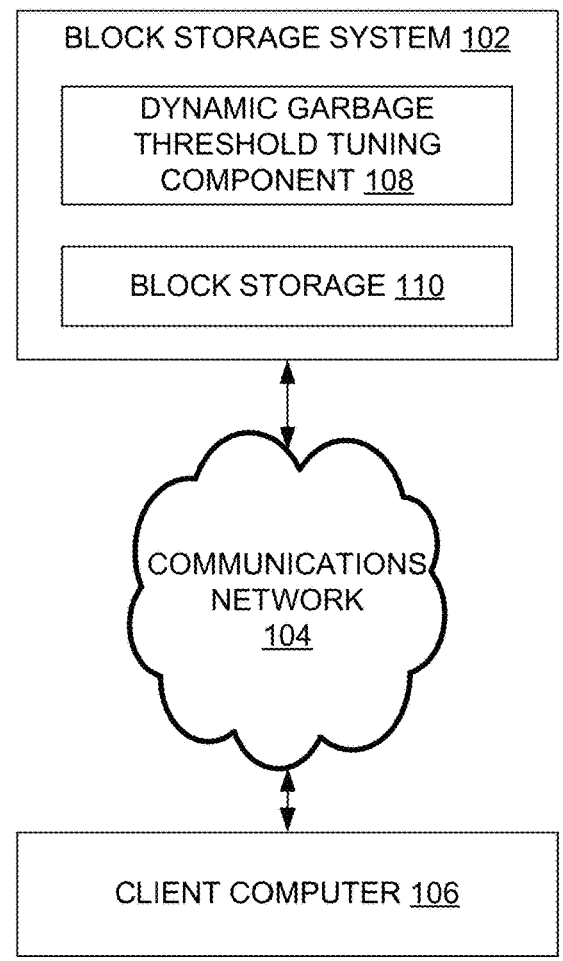
FIG. 1 illustrates an example system architecture that can facilitate dynamic tuning of garbage threshold to reduce unreclaimable garbage overhead, in accordance with an embodiment of this disclosure.

FIG. 1 illustrates an example system architecture 100 that can facilitate dynamic tuning of garbage threshold to reduce unreclaimable garbage overhead, in accordance with an embodiment of this disclosure.

System architecture 100 comprises block storage system 102, communications network 104, and client computer 106. In turn, block storage system 102 comprises dynamic garbage threshold tuning component 108 and block storage 110.

Figure 11:
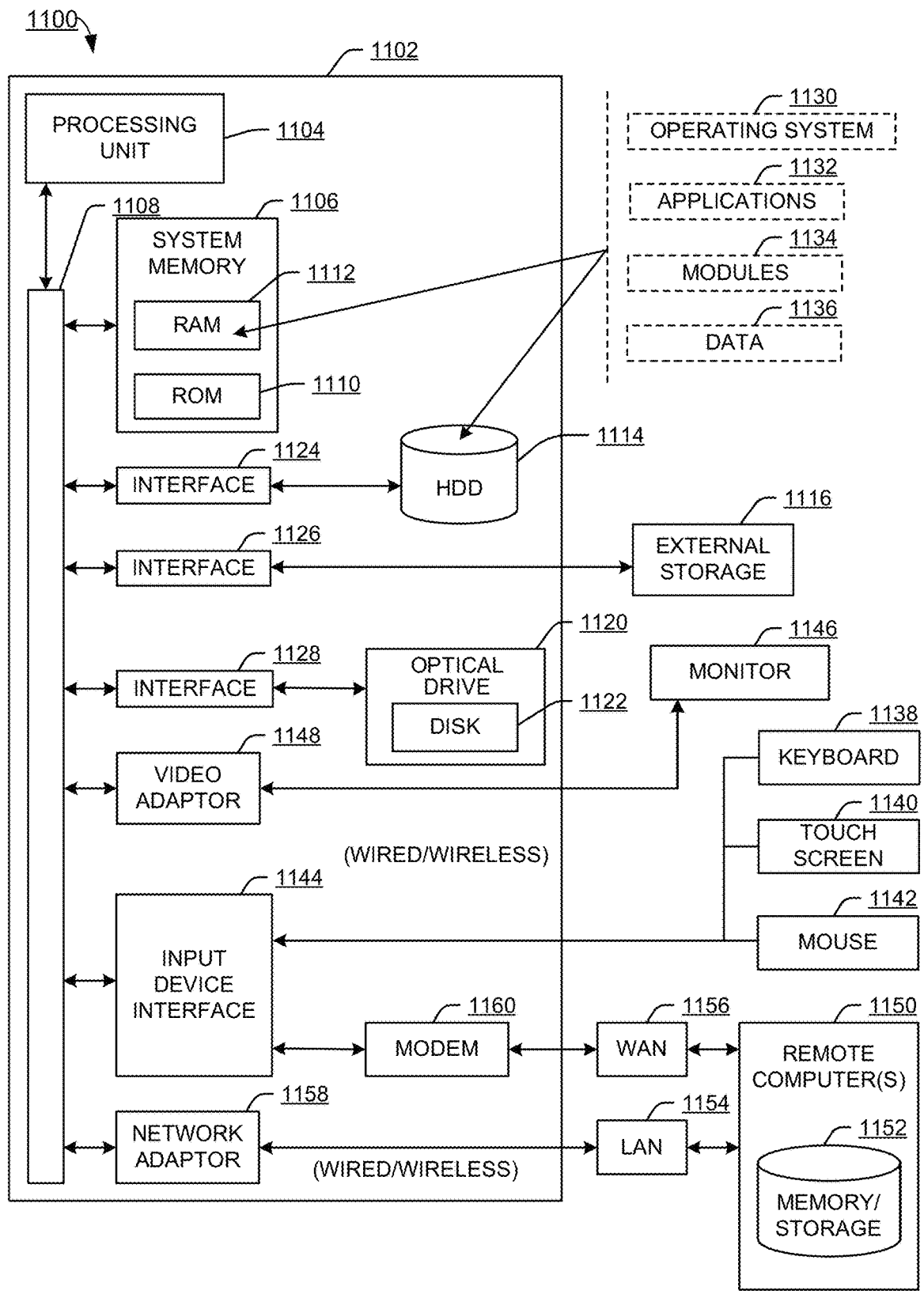
FIG. 11 illustrates an example block diagram of a computer operable to execute an embodiment of this disclosure.

Each of block storage system 102 and/or client computer 106 can be implemented with part(s) of computing environment 1100 of FIG. 11.

Block storage system 102 can provide block storage resources of block storage 110 to client computer 106, via communications network 104. Client computer 106 can access block storage system 102 to create, read, write, and delete data objects in block storage 110.

In the course of block storage system 102 providing block storage resources to client computer 106, dynamic garbage threshold tuning component 108 can handle garbage collection of data stored in block storage 110 to free space in block storage 110 without taxing computing resources of block storage system 102.

Figure 8:
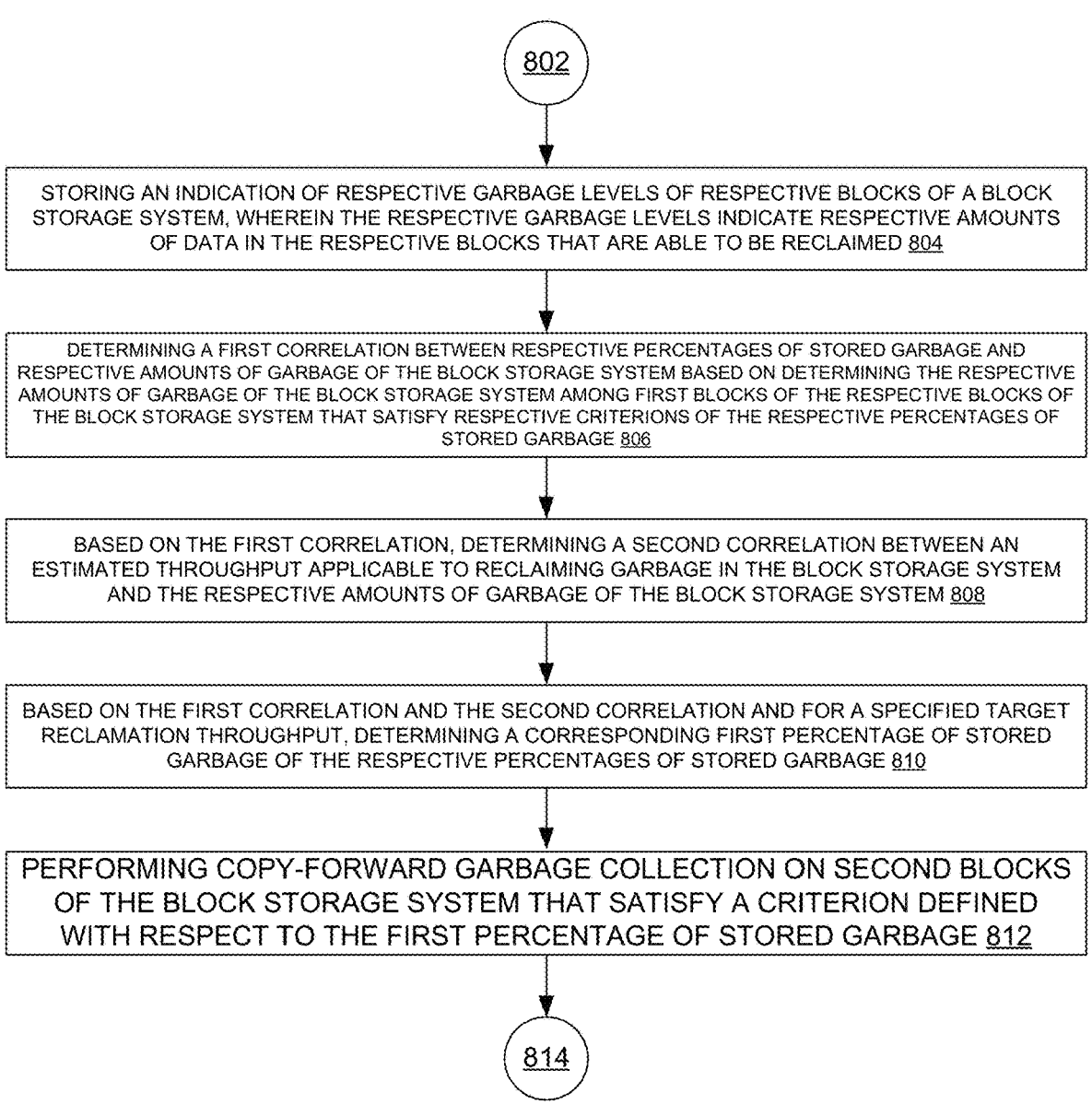
FIG. 8 illustrates an example process flow that can facilitate dynamic tuning of garbage threshold to reduce unreclaimable garbage overhead, in accordance with an embodiment of this disclosure.
Figure 10:
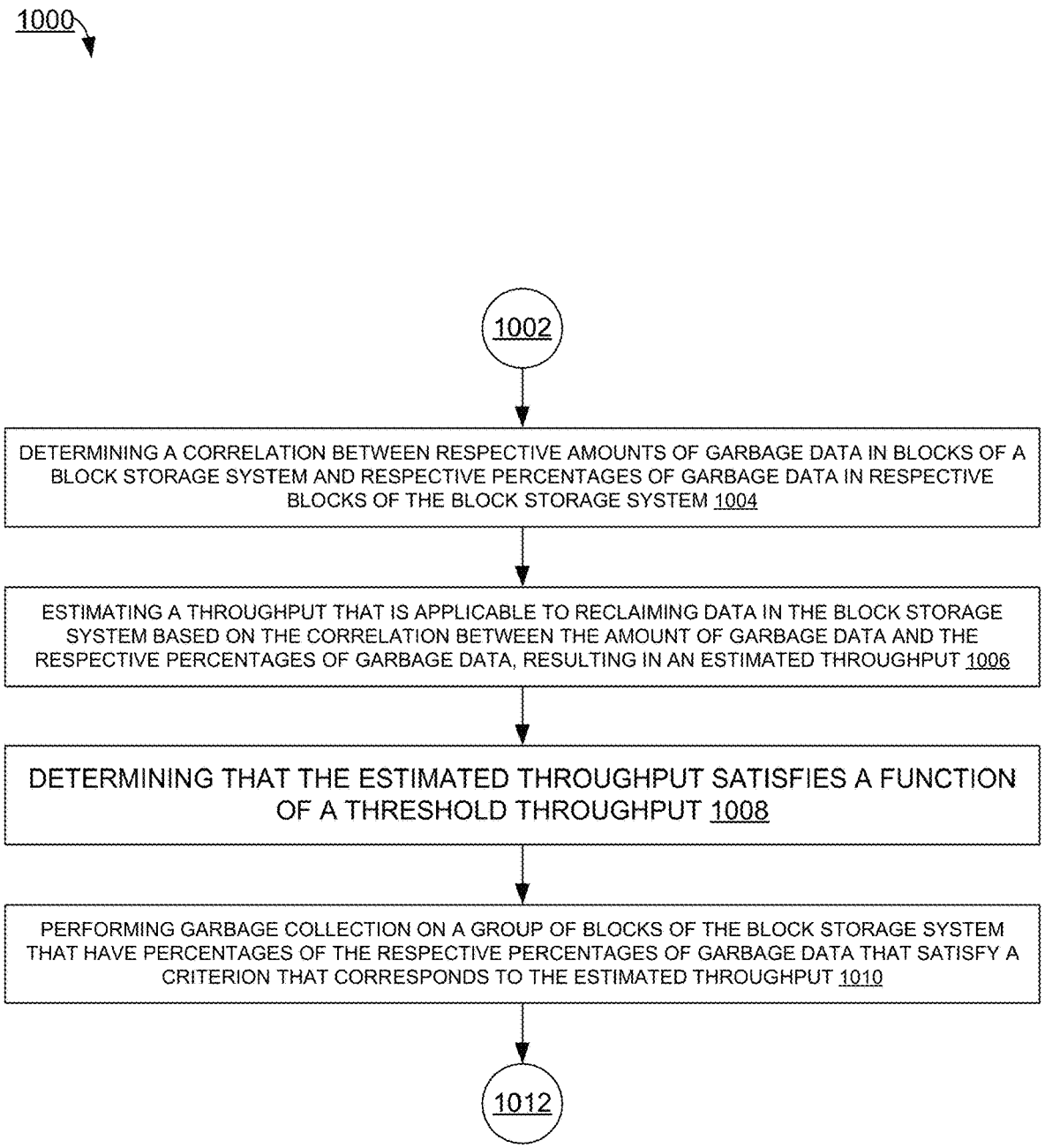
FIG. 10 illustrates another example process flow that can facilitate dynamic tuning of garbage threshold to reduce unreclaimable garbage overhead, in accordance with an embodiment of this disclosure.

In some examples, dynamic garbage threshold tuning component 108 can implement part(s) of the process flows of FIGS. 8-10 to implement dynamic tuning of garbage threshold to reduce unreclaimable garbage overhead.

It can be appreciated that system architecture 100 is one example system architecture for dynamic tuning of garbage threshold to reduce unreclaimable garbage overhead, and that there can be other system architectures that facilitate dynamic tuning of garbage threshold to reduce unreclaimable garbage overhead.

Figure 2:
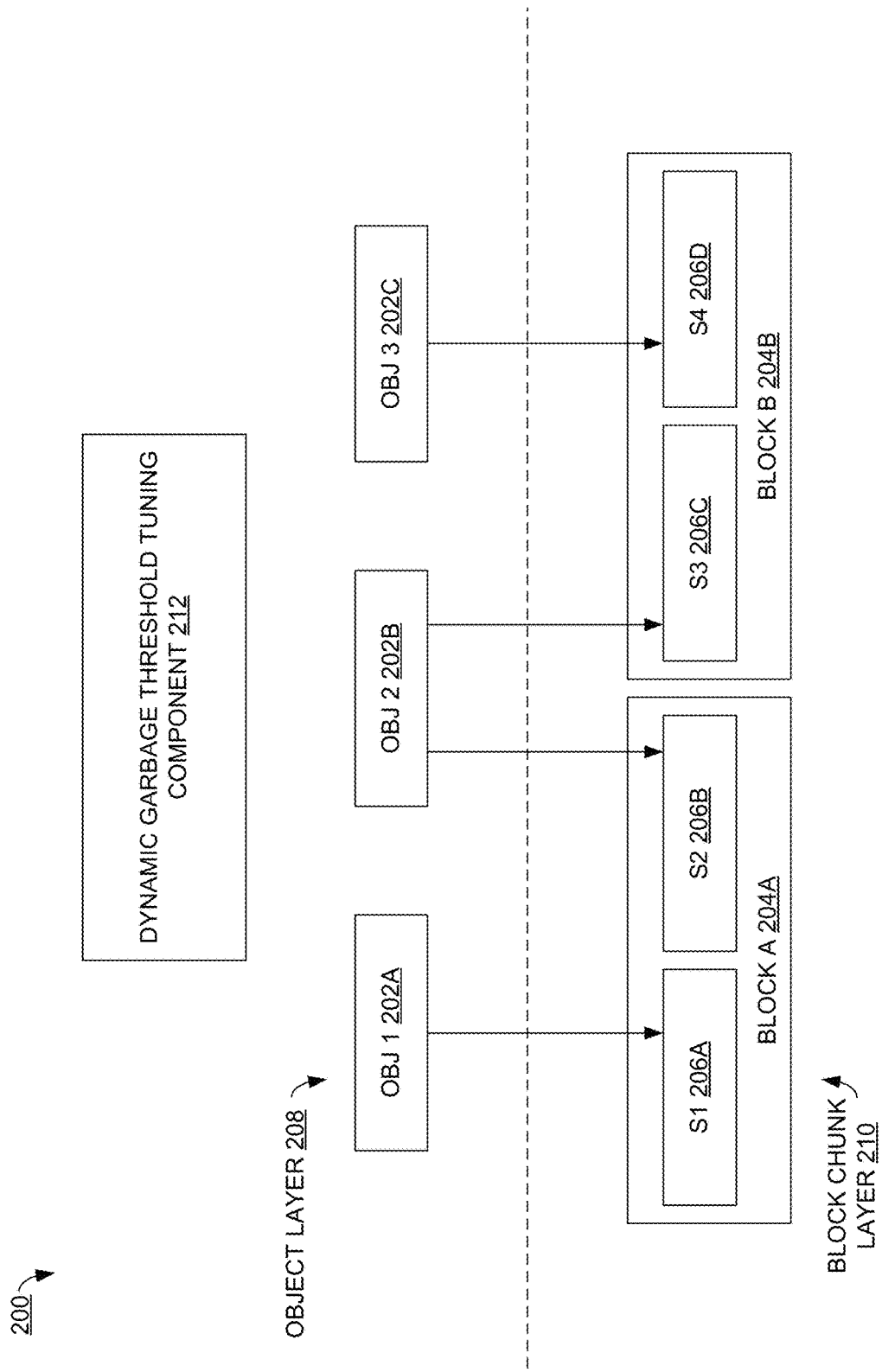
FIG. 2 illustrates an example system architecture for block storage, and that can facilitate dynamic tuning of garbage threshold to reduce unreclaimable garbage overhead, in accordance with an embodiment of this disclosure.

FIG. 2 illustrates an example system architecture 200 for block storage, and that can facilitate dynamic tuning of garbage threshold to reduce unreclaimable garbage overhead, in accordance with an embodiment of this disclosure. In some examples, system architecture 200 can be implemented in block storage 110 of FIG. 1, and used by dynamic garbage threshold tuning component 108.

As depicted, system architecture 200 comprises object 1 202A, object 2 202B, object 3 202C, block A 204A, block B 204B, data segment S1 206A, data segment S2 206B, data segment S3 206C, data segment S4 206D, object layer 208, block chunk layer 210, and dynamic garbage threshold tuning component 212.

Object 1 202A, object 2 202B, and object 3 202C can each be data objects stored by a block storage system, such as data objects provided by client computer 106 of FIG. 1 to block storage system 102 for storage in block storage 110. Block A 204A and block B 204B can each be data blocks of block storage 110 in which data objects can be stored.

Data segment S1 206A, data segment S2 206B, data segment S3 206C, data segment S4 206D can each be segments of block storage blocks. Object layer 208 can indicate portions of system architecture 200 in which data is represented as objects (e.g., object 1 202A). Block chunk layer 210 can indicate portions of system architecture 200 in which data is represented as data blocks (or chunks). Dynamic garbage threshold tuning component 212 can be similar to dynamic garbage threshold tuning component 108 of FIG. 1.

Some block storage systems can store user data in protected, fixed-size blocks that can be called chunks. In such an architecture, a data object can be represented as a set of data segments that are stored in different blocks. For example, one block can contain segments of multiple user objects.

System architecture 200 illustrates a block-based storage system architecture. In system architecture 200, data of object 1 202A, object 2 202B, and object 3 202C is represented as data segment S1 206A, data segment S2 206B, data segment S3 206C, and data segment S4 206D, and stored in block A 204A, block B 204B.

Figure 3:
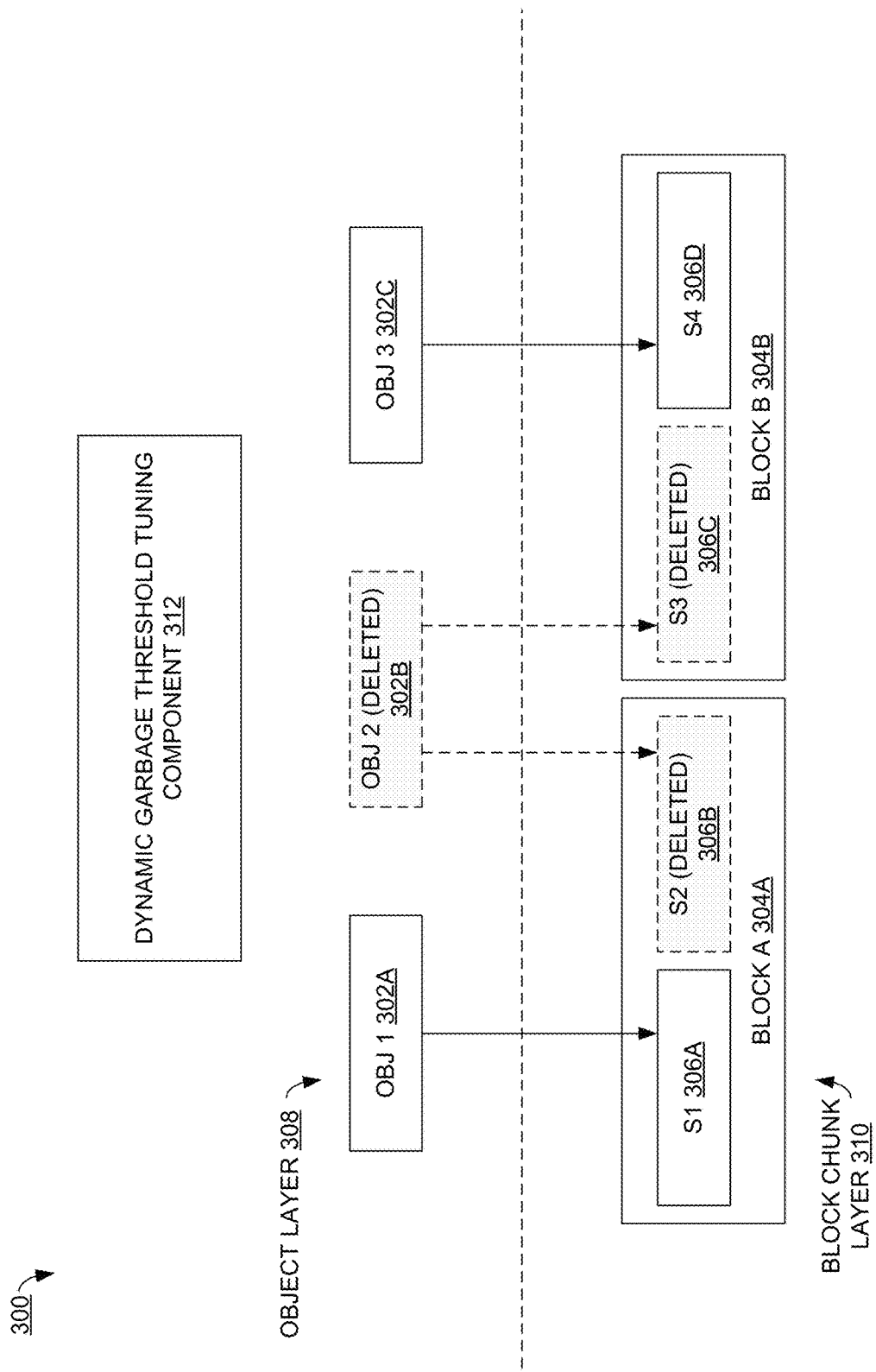
FIG. 3 illustrates an example system architecture for deleting an object from block storage, and that can facilitate dynamic tuning of garbage threshold to reduce unreclaimable garbage overhead, in accordance with an embodiment of this disclosure.

FIG. 3 illustrates an example system architecture 300 for deleting an object from block storage, and that can facilitate dynamic tuning of garbage threshold to reduce unreclaimable garbage overhead, in accordance with an embodiment of this disclosure. In some examples, system architecture 300 can be implemented in block storage 110 of FIG. 1, and used by dynamic garbage threshold tuning component 108.

System architecture 300 can generally comprise system architecture 200 of FIG. 2 after a data object has been deleted.

As depicted, system architecture 300 comprises object 1 302A, object 2 302B, object 3 302C, block A 304A, block B 304B, data segment S1 306A, data segment S2 306B, data segment S3 306C, data segment S4 306D, object layer 308, block chunk layer 310, and dynamic garbage threshold tuning component 312. These parts of system architecture 300 can be similar to object 1 202A, object 2 202B, object 3 202C, block A 204A, block B 204B, data segment S1 206A, data segment S2 206B, data segment S3 206C, data segment S4 206D, object layer 208, block chunk layer 210, and dynamic garbage threshold tuning component 212, respectively, of FIG. 2.

In system architecture 300, and relative to system architecture 200, object 2 302B has been deleted. The corresponding data segments of object 2 302B—data segment S2 306B and data segment S3 306C—are now marked as deleted. In the example of system architecture 300, a portion of data in a block is not reclaimed. That is, data segment S2 306B is not reclaimed by itself. Rather, an entire block is reclaimed at a time. So, until block A 204A is reclaimed, half of it is garbage—the no-longer-used data segment S2 306B (with the other half—the still-used data segment S1 306A being valid and used).

Similarly, half of block B 204B is garbage for the time being. These unused portions of data blocks can consume storage space without storing valid data.

Where a block is a minimum resource allocation unit, it can be that a block can be reclaimed if and only if all user data on the block has been deleted. Deleting partial objects on the block can result in a fragmentation where a block has both live and dead objects.

In some examples, fragmentation can be resolved by copy-forward. With copy-forward, a system can merge valid user data from source blocks (where some other data is now invalid) by copying that valid user data from multiple source blocks to one new destination block. This new block can then be full of valid user data, without fragmentation. Then, such a system can update relationships between user objects and blocks. After this, source blocks that no longer store valid user data (because it has been copied to a destination block) can be reclaimed.

Figure 4:
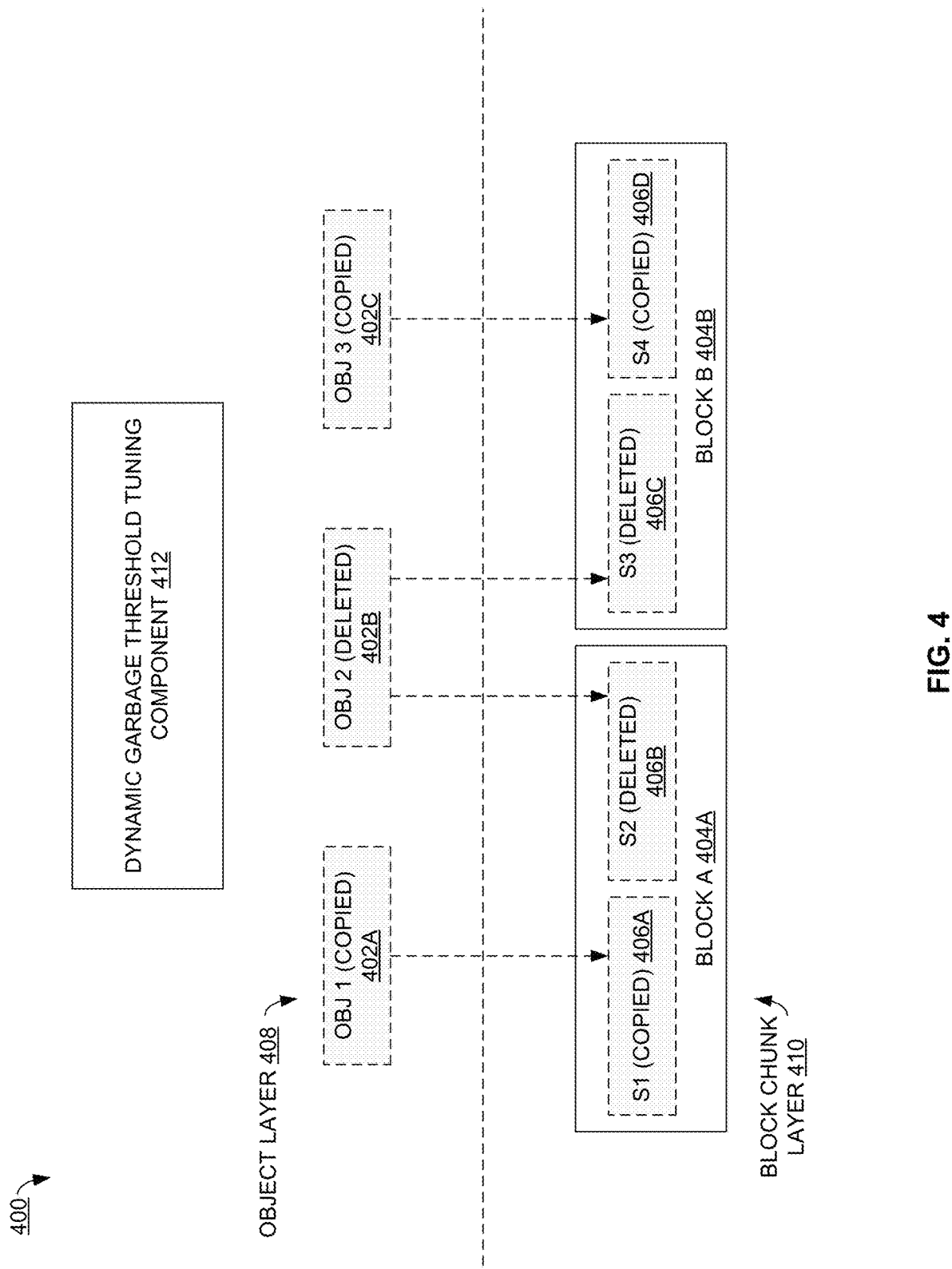
FIG. 4 illustrates an example system architecture for copy-forwarding in block storage, and that can facilitate dynamic tuning of garbage threshold to reduce unreclaimable garbage overhead, in accordance with an embodiment of this disclosure.

FIG. 4 illustrates an example system architecture 400 for copy-forwarding in block storage, and that can facilitate dynamic tuning of garbage threshold to reduce unreclaimable garbage overhead, in accordance with an embodiment of this disclosure. In some examples, system architecture 400 can be implemented in block storage 110 of FIG. 1, and used by dynamic garbage threshold tuning component 108.

System architecture 400 can generally comprise system architecture 300 of FIG. 3 as a result of a copy-forward operation. System architecture 400 can illustrate blocks from which a copy-forward is performed, with system architecture 500 illustrating the new storage block resulting from the copy-forward.

As depicted, system architecture 400 comprises object 1 402A, object 2 402B, object 3 402C, block A 404A, block B 404B, data segment S1 406A, data segment S2 406B, data segment S3 406C, data segment S4 406D, object layer 408, block chunk layer 410, and dynamic garbage threshold tuning component 412. These parts of system architecture 400 can be similar to object 1 302A, object 2 302B, object 3 302C, block A 304A, block B 304B, data segment S1 306A, data segment S2 306B, data segment S3 306C, data segment S4 306D, object layer 308, block chunk layer 310, and dynamic garbage threshold tuning component 312, respectively, of FIG. 3.

In system architecture 400, and relative to system architecture 300, data segment S1 406A and data segment S4 406D (as well as corresponding objects object 1 402A and object 3 402C) are deleted because they have been copied to a new data block as part of a copy-forward operation.

This copy-forward operation can aggregate these data segments in fewer data blocks than in system architecture 400. Additionally, since all segments in each of block A 404A and block B 404B are deleted, these blocks can be reclaimed as free storage space that is available for storing new data objects.

Put another way, after object 2 402B is deleted, data segment S2 406B in block A 404A and data segment S3 406C in block B 404B become garbage. Dynamic garbage threshold tuning component 412 can merge data segment S2 406B in block A 404A and data segment S3 406C in block B 404B to a new block C (block C 504C of FIG. 5), so block A 404A and block B 404B become fully empty and reclaimable.

Figure 5:
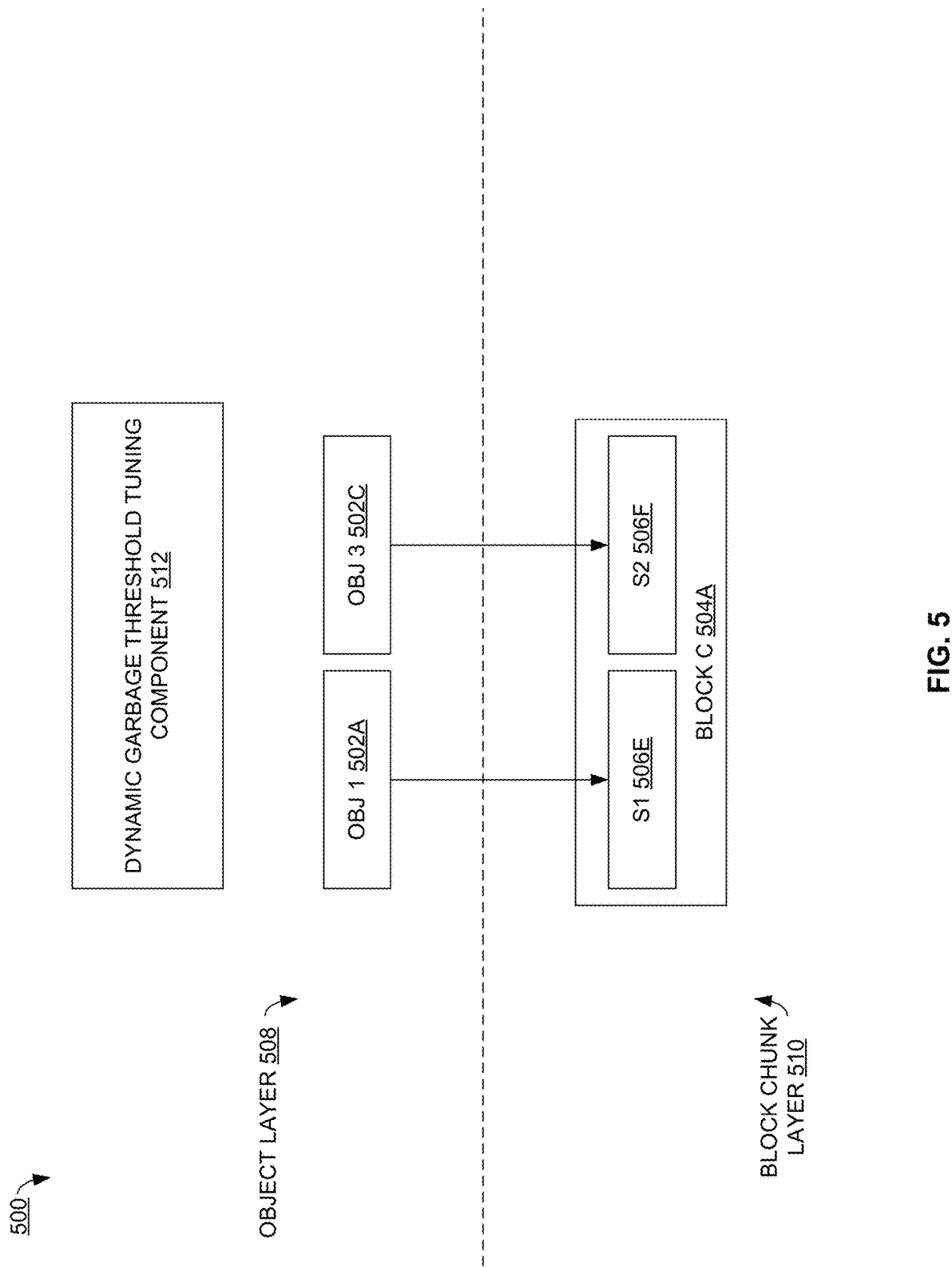
FIG. 5 illustrates another example system architecture for copy-forwarding in block storage, and that can facilitate dynamic tuning of garbage threshold to reduce unreclaimable garbage overhead, in accordance with an embodiment of this disclosure.

FIG. 5 illustrates another example system architecture 500 for copy-forwarding in block storage, and that can facilitate dynamic tuning of garbage threshold to reduce unreclaimable garbage overhead, in accordance with an embodiment of this disclosure. In some examples, system architecture 500 can be implemented in block storage 110 of FIG. 1, and used by dynamic garbage threshold tuning component 108.

As depicted, system architecture 500 comprises object 1 502A, object 2 502B, object layer 508, block chunk layer 510, and dynamic garbage threshold tuning component 512. These parts of system architecture 500 can be similar to object 1 302A, object 2 302B, object layer 308, block chunk layer 310, and dynamic garbage threshold tuning component 312, respectively, of FIG. 3. System architecture also comprises block C 504C, data segment S1 506E, and data segment S4 506F.

In system architecture 500, and relative to system architecture 300, data segment S1 306A and data segment S4 306D (as well as corresponding objects object 1 302A and object 3 302C) have been copied to data segment S1 506A and data segment S4 506D (as well as corresponding objects object 1 502A and object 3 502C) as part of a copy-forward operation to copy valid data in block A 304A and block B 304B.

These new data segments (data segment S1 506A and data segment S4 506D) are stored in a new block, block C 506C. As a result, what was once stored in two blocks (block A 304A and block B 304B) is now stored in one block (block C 506C), for a net storage savings of one block after deleting the two blocks (block A 304A and block B 304B).

For each block, a garbage threshold can be determined, which can be a measure of a percentage of invalid data of a block. Performing a copy-forward operation can consume input/output (I/O) resources in copy-forwarding data from source blocks to destination blocks, so an approach can be to start copy-forward operations on blocks that have a highest garbage ratio, and then move to blocks with successfully lower garbage ratios.

It can also be that a system does not perform a copy-forward operation on blocks below a certain garbage threshold. For example, it can be that a system does not perform a copy-forward on a block with 99% valid data, because performing a copy-forward can consume processing resources, memory resources, I/O resources, and network bandwidth resources. Consuming these computing resources can negatively impact a system's front-end access latency and/or transactions per second (TPS).

Given that, there can be scenarios where determining a garbage threshold value is not straightforward. Some systems can use a fixed garbage threshold to perform a copy forward (e.g., a garbage threshold can be 67%), but it can be that one threshold is not appropriate in all circumstances. However, it can be impractical for users to monitor unreclaimable garbage to change their garbage threshold value, or get details from a technical engineer to manually determine an optimal (or good) threshold for a given system. So, in some cases, users can run out of storage space because they have a high amount of unreclaimable garbage, which can cause space wastage and customer dissatisfaction.

The present techniques can be implemented to improve garbage collection automatically, without use intervention.

The present techniques can be implemented to facilitate a dynamic garbage threshold that can be determined based on various parameters, such as available storage space, ingestion rate, reclamation speed, amount of unreclaimable garbage, etc.

A target reclamation throughput can be derived from defragmentation targets and resource constraints of a system including:
  Minimal reclamation throughput in order to catch up with a user data ingestion rate;
  Storage overhead watermarks so that a system can try to increase a throughput when storage overhead is above a high watermark, and keep the throughput when storage overhead is below the low watermark; and
  Maximum data volume copied per unit time, which can keep a resource usage of copy-forward under control.

These targets and constraints can vary over time, and the target reclamation throughput can also vary. These targets can be determined automatically by a system, or controlled by users. For example, a user can set an aggressive target throughput during system idle hours, and a conservative target throughput during peak hours. These targets and constrains, and corresponding system metrics, can be inputs of a predictive model, where a corresponding output can be a target reclamation throughput:
  Target Reclamation Throughput=f(ingestion rate, used capacity, storage overhead, system load, . . . )

For example, a user can define a reclamation target that requires that garbage data does not exceed 10% of total consumed capacity 48 hours after deletion. Where a user deletes 30 terabytes (TB) from 90 TB of existing data, the garbage data can be 30 TB, and the total consumed capacity can be 60 TB. The target throughput can be determined as, (30 TB−60 TB×10%)/48 hour=0.5 TB/hour.

In another example can involve a computing cluster that is nearly full, and that receives continuous data ingestion and deletion concurrently. Where the ingestion and deletion rates are both 100 gigabytes (GB)/hour (hr), it can be that the reclamation throughput should also be at least 100 GB/hr (on average) to keep up with the ingestion rate so that the storage space will not eventually become full. This approach can become more complicated where system load an ingestion rates vary. A model according to the present techniques can be pre-trained from multiple sets of testing data, and then revised online incrementally in each run with historical data from previous runs.

Figure 6:
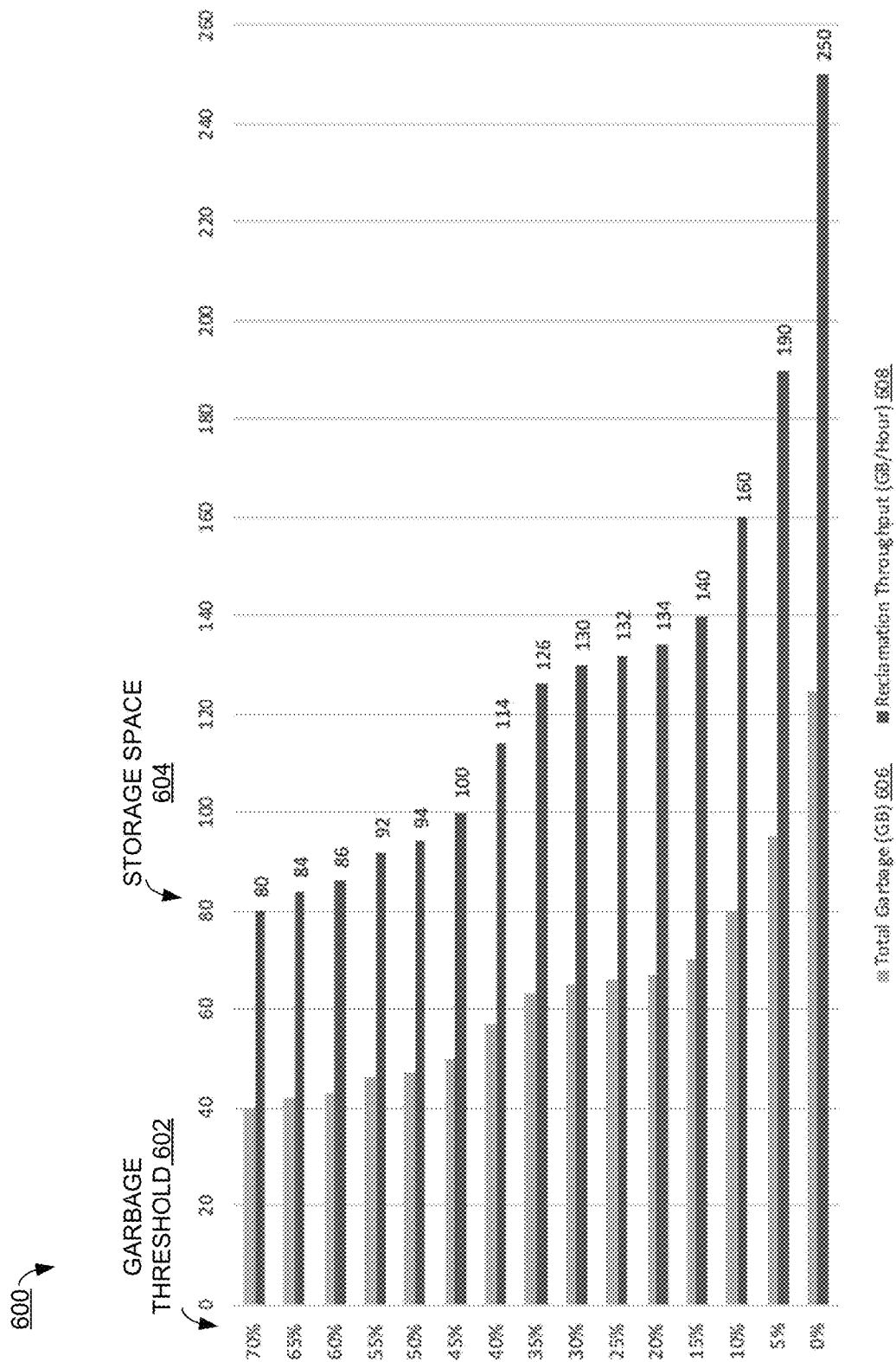
FIG. 6 illustrates an example graph that can facilitate dynamic tuning of garbage threshold to reduce unreclaimable garbage overhead, in accordance with an embodiment of this disclosure.

In some examples, and based on a principle of meeting target reclamation throughput with minimum resource usage, a garbage threshold according to the present techniques can be determined according to these steps:
1. Store a garbage level of each block in a sorted B-tree in descending order. A B-tree can generally comprise a data structure that is configured to maintain sorted data and permit searches on that sorted data.
2. Starting with a default threshold, e.g., 70%, build a block list of blocks that have a garbage level that is beyond the threshold. This can be performed by listing from the B-tree until the garbage level is lower than the threshold. An amount of garbage of each of these identified blocks can be determined.
3. Lower the threshold by a predetermined interval (e.g., 5%), and continue listing from the B-tree until the garbage level is lower than the new threshold (e.g., 65%). A total amount garbage at the 65% threshold can then be determine incrementally by adding new eligible blocks into the block list.
4. Repeat the above steps until the threshold is 0 (e.g., all blocks have been considered). At the end of a cycle of these steps, build a correlation between garbage size and garbage threshold:
  Garbage Threshold=f (garbage size)
5. By taking garbage size as the input, a reclamation throughput can be estimated:
  Estimated Reclamation Throughput=f(garbage size)
6. Correspondingly, build a correlation between estimated reclamation throughput and garbage thresholds. Based on the correlation, choose the largest garbage threshold with which the estimated reclamation throughput is no less than the target reclamation throughput.
  Combining this with steps 4 and 5 can result in:
  Garbage Threshold=f(garbage size, target reclamation throughput), where
    Estimated Reclmation Throughput=f(garbage size) ≥Target Reclamation Throughput An initial garbage threshold in a first run and a corresponding estimated throughput can be set empirically. After each run, a system can determine an actual throughput observed in the last run to revise the correlation between total garbage size and estimated throughput. This updated correlation can then be used to guide the threshold adjustment in the next run. This can lead to the following approach to determining a garbage threshold:
  Garbage Threshold=f(garbage size, target reclamation throughput), where Estimated Reclmation Throughput=f(garbage size, historical garbage size, historical reclamation throughput)≥Target Reclamation Throughput FIG. 6 illustrates an example graph 600 that can facilitate dynamic tuning of garbage threshold to reduce unreclaimable garbage overhead, in accordance with an embodiment of this disclosure. In some examples, graph 600 can be implemented in block storage 110 of FIG. 1, and used by dynamic garbage threshold tuning component 108.

Graph 600 plots garbage threshold 602 on the y-axis against storage space 604 on the x-axis for both total garbage 606 (in GB) and reclamation throughput 608 (in GB/hr)

Consider again an example of a 100 GB/hour ingestion rate, where a target reclamation throughput is also 100 GB/hour. During an initial run, a system can start with blocks beyond a 70% garbage threshold. These blocks can contain 40 GB of total garbage, and can be reclaimed after 30 minutes, resulting in a throughput of 80 GB/hour if performing a copy-forward of 40 GB of garbage in one run.

Taking garbage size and a real throughput data from an initial run as input, a correlation between total garbage size, estimated reclamation throughput, and a garbage threshold, can be shown in graph 600.

By leveraging a correlation in graph 600, a system (e.g., dynamic garbage threshold tuning component 108 of FIG. 1) can determine that an estimated reclamation throughput at 50%, 45%, and 40% garbage thresholds can be 94 GB, 100 GB, and 114 GB, respectively. The system can then bring the garbage threshold down to 45% in a second run, which can meet a target reclamation throughput while minimizing (or reducing, compared to other approaches) system resource consumption.

Figure 7:
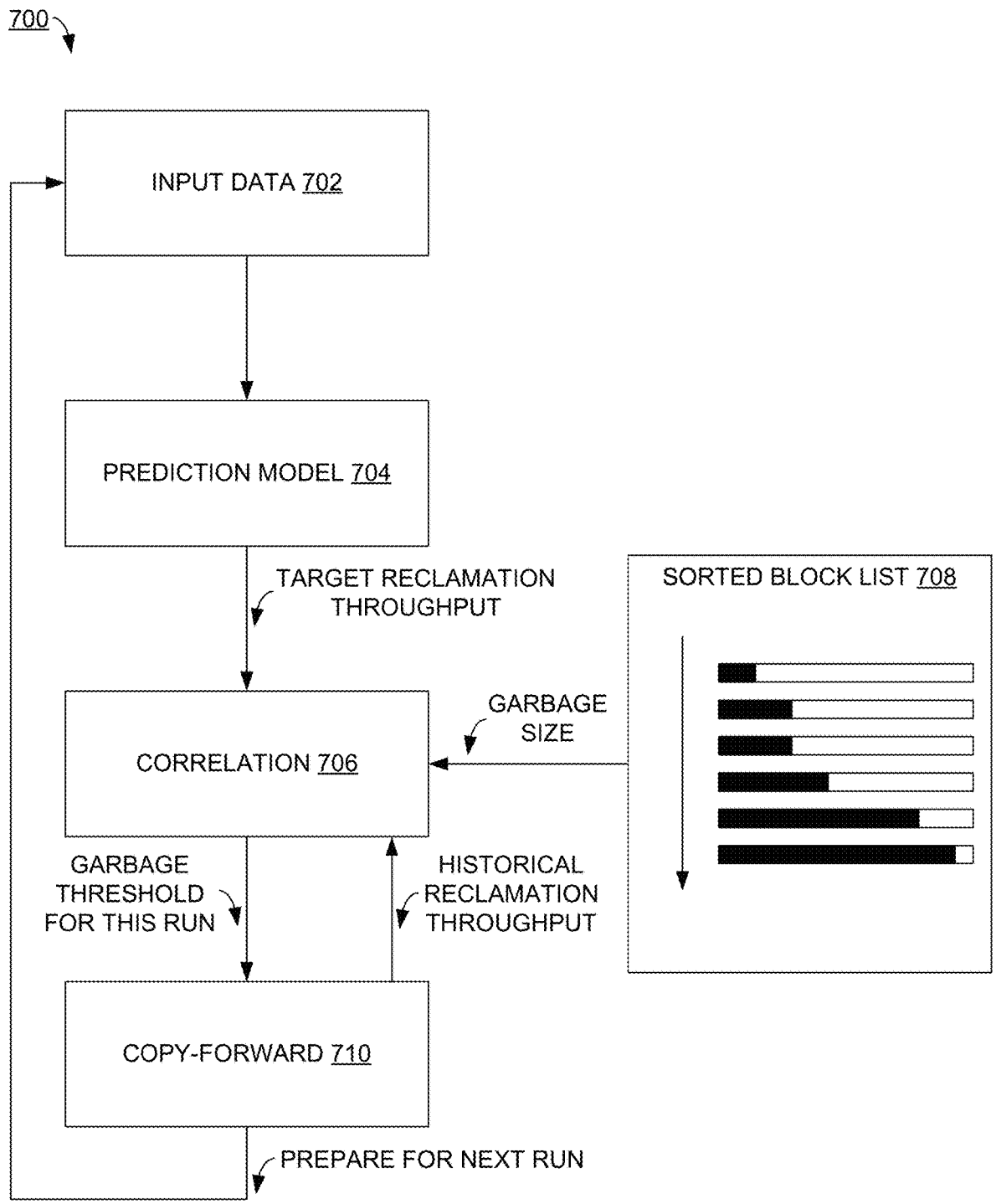
FIG. 7 illustrates an example system architecture that can facilitate dynamic tuning of garbage threshold to reduce unreclaimable garbage overhead, in accordance with an embodiment of this disclosure.

FIG. 7 illustrates an example system architecture 700 that can facilitate dynamic tuning of garbage threshold to reduce unreclaimable garbage overhead, in accordance with an embodiment of this disclosure. In some examples, part(s) of system architecture 700 can be implemented by dynamic garbage threshold tuning component 108 of FIG. 1.

System architecture 700 comprises input data 702, prediction model 704, correlation 706, sorted block list 708, and copy-forward 710.

Input data 702 can include information such as ingestion rate (which can comprise a rate at which data is being transferred into the system, or created by the system); used capacity (which can comprise an amount of total storage that is currently being used to store data); storage overhead (which can comprise an amount of total storage space that is used for storing metadata about the data being stored); system load (which can comprise an amount of total processing resources being used); minimal reclamation throughput (which can comprise a minimum rate of reclamation to perform); target storage overhead (which can comprise a target level for storage overhead); and minimum resource usage of copy-forward (which can comprise a minimum amount of processing resources used in garbage collection). Prediction model 704 can be implemented such that:

Target Reclamation Throughput=f(ingestion rate, used capacity, storage overhead, system load, . . . )

Prediction model 704 can output the target reclamation throughput to correlation 706. Correlation 706 can use the target reclamation throughput from prediction model 704 and a garbage size from sorted block list 708. Sorted block list 708 can comprise a list of blocks of a storage system, sorted from most utilized to least utilized (or vice versa; put another way, sorted by garbage ratio).

Correlation 706 can use the target reclamation throughput from prediction model 704 and a garbage size from sorted block list 708 to determine a garbage threshold value to use for a current garbage collection run. That is, correlation 706 can determine a correlation of garbage threshold with garbage size and reclamation throughput and output a garbage threshold for the next run to copy-forward 710.

In some examples, correlation 706 can also utilize historical reclamation throughput information from copy-forward 710 to determine the garbage threshold for the next run.

Example Process Flows

FIG. 8 illustrates an example process flow 800 that can facilitate dynamic tuning of garbage threshold to reduce unreclaimable garbage overhead, in accordance with an embodiment of this disclosure. In some examples, one or more embodiments of process flow 800 can be implemented by dynamic garbage threshold tuning component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804. Operation 804 depicts storing an indication of respective garbage levels of respective blocks of a block storage system, wherein the respective garbage levels indicate respective amounts of data in the respective blocks that are able to be reclaimed. This can comprise, for example, storing a garbage level of each block in a sorted B-tree in descending order.

After operation 804, process flow 800 moves to operation 806.

Operation 806 depicts determining a first correlation between respective percentages of stored garbage and respective amounts of garbage of the block storage system based on determining the respective amounts of garbage of the block storage system among first blocks of the respective blocks of the block storage system that satisfy respective criterions of the respective percentages of stored garbage. That is, for different garbage thresholds, blocks can be found that satisfy that garbage threshold. From that, a correlation between garbage thresholds and an amount of garbage stored in blocks satisfying those garbage thresholds can be determined—e.g., Garbage Threshold=f(garbage size) can be determined.

In some examples, operation 806 comprises performing iterations of, selecting a garbage threshold value, determining a group of blocks of the block storage system that satisfy the garbage threshold value, and lowering the garbage threshold value by a defined amount until the garbage threshold value is zero or less than zero. That is, iterations can be performed with different garbage threshold values to determine the correlation between garbage size and garbage threshold. For example, in operation 806, an initially-used threshold can be iteratively lowered by 5%, and listing from a B-tree that stores blocks sorted by garbage level can be performed until the garbage level is lower than 65%. A total garbage at a 65% threshold can then be determined incrementally by adding new eligible blocks into the block list."

In some examples where a first iteration of the performing of the iterations has been performed, determining the group of blocks in a second iteration of the performing of the iterations comprises adding newly determined blocks in the second iteration to the group of blocks from the first iteration. That is, for an iteration, a starting point can be the previous iteration's collection of identified blocks. That is, for an iteration with a garbage threshold of 65%, the blocks determined in a previous iteration with a garbage level of 70% can be used (since they all exceed the 65% garbage level), and to them, blocks with a garbage level between 65-70% can be added.

In some examples, operation 806 comprises storing the respective garbage levels of the respective blocks of the block storage system in a descending order in a data structure, where determining the group of blocks of the block storage system that satisfy the garbage threshold value comprises listing the respective blocks from the data structure until encountering a block that has a first garbage level that is lower than the garbage threshold value. In some examples, the data structure comprises a B-tree structure. That is, information about the blocks can be stored in a data structure, and this data structure can be used in determining the first correlation.

After operation 806, process flow 800 moves to operation 808.

Operation 808 depicts, based on the first correlation, determining a second correlation between an estimated throughput applicable to reclaiming garbage in the block storage system and the respective amounts of garbage of the block storage system. That is, Estimated Reclamation Throughput=f(garbage size) can be determined.

After operation 808, process flow 800 moves to operation 810.

Operation 810 depicts, based on the first correlation and the second correlation and for a specified target reclamation throughput, determining a corresponding first percentage of stored garbage of the respective percentages of stored garbage. That is, these two correlations can be used to determine a garbage threshold that will meet a target reclamation throughput.

After operation 810, process flow 800 moves to operation 812.

Operation 812 depicts performing copy-forward garbage collection on second blocks of the block storage system that satisfy a criterion defined with respect to the first percentage of stored garbage. That is, copy-forward garbage collection can be performed using the garbage threshold determined in operation 810.

In some examples where performing the copy-forward garbage collection comprises performing a first garbage collection, operation 812 comprises determining a throughput associated with performing the first garbage collection, updating the second correlation based on the throughput to produce an updated second correlation. In some examples, operation 812 comprises performing a second garbage collection based on the updated second correlation. That is, observed results in performing garbage collection can be used to update a correlation between garbage size and throughput, and this updated correlation can be used to perform a subsequent garbage collection.

After operation 812, process flow 800 moves to 814, where process flow 800 ends.

FIG. 9 illustrates an example process flow 900 that can facilitate dynamic tuning of garbage threshold to reduce unreclaimable garbage overhead, in accordance with an embodiment of this disclosure. In some examples, one or more embodiments of process flow 900 can be implemented by dynamic garbage threshold tuning component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904. Operation 904 depicts determining a correlation between a garbage size and a garbage threshold of a block storage system. In some examples, operation 904 can be implemented in a similar manner as operation 804 of FIG. 8.

After operation 904, process flow 900 moves to operation 906.

Operation 906 depicts determining an estimated throughput associated with reclaiming data in the block storage system based on the correlation between the garbage size and the garbage threshold, wherein the estimated throughput has been determined to satisfy a threshold throughput criterion. In some examples, operation 906 can be implemented in a similar manner as operation 808 of FIG. 8.

In some examples, operation 906 comprises determining that the estimated throughput is greater than a target reclamation throughput that is determined based on an ingestion rate of the block storage system. That is, a target reclamation throughput can be determined as a function of ingestion rate.

In some examples, operation 906 comprises determining that the estimated throughput is greater than a target reclamation throughput that is determined based on a used capacity of the block storage system. That is, a target reclamation throughput can be determined as a function of used capacity.

In some examples, operation 906 comprises determining that the estimated throughput is greater than a target reclamation throughput that is determined based on a storage overhead of the block storage system. That is, a target reclamation throughput can be determined as a function of storage overhead. Storage overhead can comprise a difference between an actual space used in the storage system and the real user data size. In some examples, it can be that a smaller storage overhead is preferable. Storage overhead can increase when there is garbage pending reclamation, so a target reclamation throughput can be set high when storage overhead is large.

In some examples, operation 906 comprises determining that the estimated throughput is greater than a target reclamation throughput that is determined based on a system load of the block storage system. That is, a target reclamation throughput can be determined as a function of system load.

In some examples, operation 906 comprises determining that the estimated throughput is greater than a target reclamation throughput at the future time. In some examples, operation 906 comprises determining different values for the target reclamation throughput at different future times other than the future time. That is, a target reclamation throughput can be determined as a function of a predicted target reclamation throughput for a future time, and this predicted target reclamation throughput can vary for different times.

After operation 906, process flow 900 moves to operation 908.

Operation 908 depicts performing garbage collection on respective blocks of the block storage system that have respective garbage thresholds that satisfy a criterion that corresponds to the estimated throughput. In some examples, operation 908 can be implemented in a similar manner as operation 812 of FIG. 8.

After operation 908, process flow 900 moves to 910 where process flow 900 ends.

FIG. 10 illustrates an example process flow 1000 that can facilitate dynamic tuning of garbage threshold to reduce unreclaimable garbage overhead, in accordance with an embodiment of this disclosure. In some examples, one or more embodiments of process flow 1000 can be implemented by dynamic garbage threshold tuning component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004. Operation 1004 depicts determining a correlation between respective amounts of garbage data in blocks of a block storage system and respective percentages of garbage data in respective blocks of the block storage system. In some examples, operation 1004 can be implemented in a similar manner as operation 806 of FIG. 8.

After operation 1004, process flow 1000 moves to operation 1006.

Operation 1006 depicts estimating a throughput that is applicable to reclaiming data in the block storage system based on the correlation between the amount of garbage data and the respective percentages of garbage data, resulting in an estimated throughput. In some examples, operation 1006 can be implemented in a similar manner as operation 808 of FIG. 8.

After operation 1006, process flow 1000 moves to operation 1008.

Operation 1008 depicts determining that the estimated throughput satisfies a function of a threshold throughput. In some examples, operation 1008 can be implemented in a similar manner as operation 810 of FIG. 8.

After operation 1008, process flow 1000 moves to operation 1010.

Operation 1010 depicts performing garbage collection on a group of blocks of the block storage system that have percentages of the respective percentages of garbage data that satisfy a criterion that corresponds to the estimated throughput. In some examples, operation 1010 can be implemented in a similar manner as operation 812 of FIG. 8.

In some examples, the block storage system is configured to prevent reclaiming garbage from a sub-portion of a block of the blocks of the block storage system. That is, in some examples, process flow 1000 can be implemented on a storage architecture, such as a copy-forward architecture, where the smallest amount of data that can be reclaimed is one block (and only a part of a block cannot be reclaimed by itself).

In some examples, operation 1010 comprises performing the garbage collection on at least a first block and a second block of the block storage system, and performing the garbage collection on at least the first block and the second block comprises copying first valid data from the first block to a third block of the block storage system, copying second valid data from the second block to the third block, and reclaiming respective storage spaces of the first block and the second block.

In some examples, the garbage collection is first garbage collection, and operation 1010 comprises, based on a result of performing the first garbage collection, adjusting a value of the estimated throughput before performing a second garbage collection. In some examples, operation 1010 comprises, based on adjusting the value of the estimated throughput, adjusting a value of a percentage of garbage data, of the respective percentages, used in performing the second garbage collection. That is, a historical reclamation throughput can be used in performing subsequent garbage collection runs. This historical reclamation throughput can be used to adjust a garbage threshold value that is used in a subsequent run.

In some examples, the garbage collection is a first garbage collection, the percentage of garbage data is a first percentage of garbage data, and operation 1010 comprises based on a current processing capacity of the block storage system, modifying a value of a second percentage of garbage data, of the respective percentages, used in a second garbage collection after the first garbage collection. That is, a garbage threshold used in performing garbage threshold can be adjusted based on available processing capacity, so that more (or fewer) blocks are garbage collected.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of block storage system 102, communications network 104, and/or client computer 106.

In some examples, computing environment 1100 can implement one or more embodiments of the process flows of FIGS. 8-10 to facilitate dynamic tuning of garbage threshold to reduce unreclaimable garbage overhead.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the at least one processor, comprising instructions that cause the at least one processor to perform operations comprising:
storing an indication of respective garbage levels of respective blocks of a block storage system, wherein the respective garbage levels indicate respective amounts of data in the respective blocks that are able to be reclaimed;
determining a first correlation between respective percentages of stored garbage and respective amounts of garbage of the block storage system based on determining the respective amounts of garbage of the block storage system among first blocks of the respective blocks of the block storage system that satisfy respective criterions of the respective percentages of stored garbage;
based on the first correlation, determining a second correlation between an estimated throughput applicable to reclaiming garbage in the block storage system and the respective amounts of garbage of the block storage system;
based on the first correlation and the second correlation and for a specified target reclamation throughput, determining a corresponding first percentage of stored garbage of the respective percentages of stored garbage; and
performing copy-forward garbage collection on second blocks of the block storage system that satisfy a criterion defined with respect to the first percentage of stored garbage.

2. The system of claim 1, wherein determining the first correlation comprises:
performing iterations of,
selecting a garbage threshold value,
determining a group of blocks of the block storage system that satisfy the garbage threshold value, and
lowering the garbage threshold value by a defined amount until the garbage threshold value is zero or less than zero.

3. The system of claim 2, wherein a first iteration of the performing of the iterations has been performed, and wherein determining the group of blocks in a second iteration of the performing of the iterations comprises:
adding newly determined blocks in the second iteration to the group of blocks from the first iteration.

4. The system of claim 2, wherein the operations further comprise:
  storing the respective garbage levels of the respective blocks of the block storage system in a descending order in a data structure; and
  wherein determining the group of blocks of the block storage system that satisfy the garbage threshold value comprises listing the respective blocks from the data structure until encountering a block that has a first garbage level that is lower than the garbage threshold value.

5. The system of claim 4, wherein the data structure comprises a B-tree structure.

6. The system of claim 1, wherein performing the copy-forward garbage collection comprises performing a first garbage collection, and wherein the operations further comprise:
  determining a throughput associated with performing the first garbage collection; and
  updating the second correlation based on the throughput to produce an updated second correlation.

7. The system of claim 6, wherein the operations further comprise:
  performing a second garbage collection based on the updated second correlation.

8. A method, comprising:
  determining, by a system comprising at least one processor, a first correlation between a garbage size and a garbage threshold of a block storage system;
  based on the first correlation, determining, by the system, a second correlation between an estimated throughput applicable to reclaiming garbage in the block storage system and an amount of garbage of the block storage system;
  determining, by the system, an estimated throughput associated with reclaiming data in the block storage system based on the first correlation and the second correlation, wherein the estimated throughput has been determined to satisfy a threshold throughput criterion;
  based on the first correlation and the second correlation and for a target reclamation throughput, determining, by the system, a corresponding percentage of stored garbage of the garbage size; and
  performing, by the system, garbage collection on respective blocks of the block storage system that have respective garbage thresholds that satisfy a criterion that corresponds to the target reclamation throughput.

9. The method of claim 8, wherein determining the estimated throughput comprises:
  determining that the estimated throughput is greater than the target reclamation throughput that is determined based on an ingestion rate of the block storage system.

10. The method of claim 8, wherein determining the estimated throughput comprises:
  determining that the estimated throughput is greater than the target reclamation throughput that is determined based on a used capacity of the block storage system.

11. The method of claim 8, wherein determining the estimated throughput comprises:
  determining that the estimated throughput is greater than the target reclamation throughput that is determined based on a storage overhead of the block storage system.

12. The method of claim 8, wherein determining the estimated throughput comprises
  determining that the estimated throughput is greater than a target reclamation throughput that is determined based on a system load of the block storage system.

13. The method of claim 8, wherein determining the estimated throughput is performed at a future time, and wherein determining the estimated throughput comprises:
  determining that the estimated throughput is greater than a target reclamation throughput at the future time.

14. The method of claim 13, further comprising:
  determining different values for the target reclamation throughput at different future times other than the future time.

15. A non-transitory computer-readable medium comprising instructions that, in response to execution, cause a system comprising at least one processor to perform operations, comprising:
  determining a correlation between respective amounts of garbage data in blocks of a block storage system and respective percentages of garbage data in respective blocks of the block storage system;
  estimating a throughput that is applicable to reclaiming data in the block storage system based on the correlation between the amount of garbage data and the respective percentages of garbage data, resulting in an estimated throughput;
  determining that the estimated throughput satisfies a function of a threshold throughput; and
  performing garbage collection on a group of blocks of the block storage system that have percentages of the respective percentages of garbage data that satisfy a criterion that corresponds to the estimated throughput.

16. The non-transitory computer-readable medium of claim 15, wherein the block storage system is configured to prevent reclaiming garbage from a sub-portion of a block of the blocks of the block storage system.

17. The non-transitory computer-readable medium of claim 15, wherein performing the garbage collection on a group of blocks comprises performing the garbage collection on at least a first block and a second block of the block storage system, and wherein performing the garbage collection on at least the first block and the second block comprises:
  copying first valid data from the first block to a third block of the block storage system;
  copying second valid data from the second block to the third block; and
  reclaiming respective storage spaces of the first block and the second block.

18. The non-transitory computer-readable medium of claim 15, wherein the garbage collection is first garbage collection, and wherein the operations further comprise:
  based on a result of performing the first garbage collection, adjusting a value of the estimated throughput before performing a second garbage collection.

19. The non-transitory computer-readable medium of claim 18, wherein the operations further comprise:
  based on adjusting the value of the estimated throughput, adjusting a value of a percentage of garbage data, of the respective percentages, used in performing the second garbage collection.

20. The non-transitory computer-readable medium of claim 15, wherein the garbage collection is a first garbage collection, wherein the percentage of garbage data is a first percentage of garbage data, and wherein the operations further comprise:
  based on a current processing capacity of the block storage system, modifying a value of a second percentage of garbage data, of the respective percentages, used in a second garbage collection after the first garbage collection.

\* \* \* \* \*